United States Patent

Lorek et al.

[11] Patent Number: 6,143,415
[45] Date of Patent: *Nov. 7, 2000

[54] ADHESIVE BONDING AGENT FOR PVDF, ITS APPLICATION AS BARRIER MATERIAL AND MATERIAL OBTAINED FROM THE LATTER

[75] Inventors: Serge Lorek, Pau; Philippe Bussi, Bernay; Philippe Renouard, Brionne, all of France

[73] Assignee: Elf Atochem S.A., France

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,809

[22] PCT Filed: Oct. 24, 1994

[86] PCT No.: PCT/FR94/01234

§ 371 Date: Sep. 3, 1996

§ 102(e) Date: Sep. 3, 1996

[87] PCT Pub. No.: WO95/11947

PCT Pub. Date: May 4, 1995

[30] Foreign Application Priority Data

Oct. 25, 1993 [FR] France .................... 93 12702

[51] Int. Cl.[7] .................... B32B 27/00
[52] U.S. Cl. .................. 428/421; 428/476.9; 428/500; 526/318.4
[58] Field of Search ................ 526/318.4; 428/421, 428/476.9, 500

[56] References Cited

U.S. PATENT DOCUMENTS

| Re. 21,737 | 3/1941 | Kistler et al. ............ 526/318.4 |
| 3,400,103 | 9/1968 | Samour et al. ............ 526/318.4 |
| 3,740,366 | 6/1973 | Sanderson et al. .......... 526/318.4 |
| 4,069,123 | 1/1978 | Skoultchi et al. .......... 526/318.4 |
| 4,074,004 | 2/1978 | Bateson et al. ............ 526/318.4 |
| 5,279,896 | 1/1994 | Tokunaga et al. .......... 526/318.4 |
| 5,292,842 | 3/1994 | Yang .................... 526/318.4 |
| 5,441,782 | 8/1995 | Kawashima et al. ......... 428/421 |
| 5,474,822 | 12/1995 | Röber et al. ............. 428/421 |
| 5,500,263 | 3/1996 | Röber et al. ............. 428/421 |
| 5,510,160 | 4/1996 | Jadamus et al. ........... 428/421 |
| 5,554,426 | 9/1996 | Röber et al. ............. 428/421 |
| 5,569,524 | 10/1996 | Akatsu et al. ............ 428/421 |

FOREIGN PATENT DOCUMENTS

| 0132583 | 2/1985 | European Pat. Off. .......... 428/421 |
| 0245139 | 11/1987 | European Pat. Off. .......... 428/421 |
| 56-145907 | 11/1981 | Japan .................... 526/318.4 |

Primary Examiner—Bernard Lipman
Attorney, Agent, or Firm—Pennie & Edmonds

[57] ABSTRACT

The invention relates to a bonding agent for PVDF, containing alkyl (alkyl)acrylate units and units bearing a carboxylic acid functional group. This bonding agent, containing PVDF, forms a barrier to hydrocarbons. The invention also relates to the material including the present bonding agent, especially petrol pipes including polyamide and the present bonding agent, in conjunction with PVDF.

8 Claims, No Drawings

ADHESIVE BONDING AGENT FOR PVDF, ITS APPLICATION AS BARRIER MATERIAL AND MATERIAL OBTAINED FROM THE LATTER

TECHNICAL FIELD

The present invention relates; to an adhesive bonding agent for PVDF and to its application as barrier material, as well as to the materials obtained from the latter.

BACKGROUND ART

EP 3449 describes coextrusion of PVDF with polyurethanes (PU); use of a bonding agent is unnecessary. FR 2 436 676 describes coextrusion of PVDF with polymethyl methacrylate (PMMA) and an acrylonitrile-butadiene-styrene (ABS), the PMMA film being between the PVDF and ABS films. Another example was made with poly(vinyl chloride) (PVC) instead of ABS. EP 450,994 describes an improvement to the above technique, which employs as coextrusion bonding agent the mixture: (a) 27 to 50 parts of PMMA and (b) 73 to 50 parts of a product itself consisting, per 100 parts, of 35 to 50 parts of PVDF and 65 to 50 parts of acrylic or methacrylic elastomer. This improvement increases the adhesiveness of PVDF to ABS.

FR-A-2,457,180 describes polyalkyl methacrylate as an agent for bonding PVDF to incompatible polymers. Among the incompatible polymers are mentioned ABS, polyurethane, polystyrene, polycarbonate, PVC and styrene/acrylic copolymers. However, this bonding agent, in particular PMMA, is not suitable or exhibits a low adhesion towards certain incompatible polymers.

Thus, there is no satisfactory coextrusion bonding agent for adhesively bonding a PVDF film to all the polymers which are incompatible with the latter, in particular polyamide or to a polyamide-based product.

DISCLOSURE OF THE INVENTION

The inventors has now found an adhesive bonding agent for PVDF, including a specific polymer.

Thus, the present invention provides an adhesive bonding for PVDF agent enabling it to be made to adhere to polymers which are incompatible with it, characterized in that it includes a polymer A containing units:

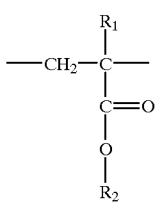
(1)

in which:
$R_1$ denotes H or a linear or branched alkyl containing from 1 to 20 carbon atoms, and
$R_2$ which is identical with or different from $R_1$ when the latter does not denote H, denotes a linear or branched alkyl containing from 1 to 20 carbon atoms,
and units:

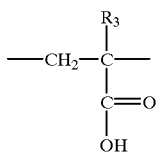
(2)

in which:
$R_3$ denotes H or a linear or branched alkyl containing from 1 to 20 carbon atoms,
in acidic form, or its anhydride derivatives, or mixtures of these.

When the unit (2) is present in its anhydride form, it is denoted by the formula:

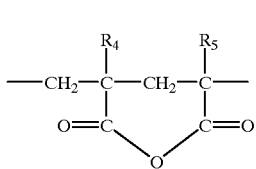
(2')

in which $R_4$ and $R_5$, which are identical or different, denote H or a linear or branched alkyl containing from 1 to 20 carbon atoms.

The term "units (2) in acidic form or its anhydride derivatives or mixtures of these" covers especially the following cases: the units (2) are substantially in acidic form; the units (2) are substantially in anhydride form, mixtures of units (2) in acidic form and in anhydride form, mixtures of units (2) where the radicals $R_3$ or $R_4$ and $R_5$ are variable. The formula given for the unit (2) also includes generally the units bearing an acidic functionality. Similarly the units (1) may be mixtures when radicals $R_1$ and $R_2$ are variable.

According to an embodiment, the polymer A includes, on a molar basis, up to 30% of unit (2), in acidic form, or its anhydride derivative or their mixtures. Advantageously, the polymer A includes, on a molar basis, up to 15% of unit (2), in acidic form, or its anhydride derivative or their mixtures.

According to another embodiment, the polymer A contains chiefly the unit (2) in acidic form.

According to still another embodiment, in the unit (1) of the polymer A, $R_1$ and $R_2$ denote the methyl radical. In this case the bonding agent is a bonding agent based on PMMA.

According to yet another embodiment, in the unit (2) of the polymer A, $R_3$ denotes the hydrogen or methyl radical in the case where the unit (2) is in acidic form, and $R_4$ and $R_5$ denote the hydrogen or methyl radical in the case where the unit (2) is in anhydride form.

The abovementioned polymers A can be prepared by any suitable process known in the art. For example, the process described in EP-A-216,505 will be mentioned.

For the purposes of the present invention, PVDF denotes a homopolymer or a copolymer containing at least 70% by weight of vinylidene fluoride residues. The PVDF may also be mixed with another thermoplastic polymer, provided that at least 50% by weight of PVDF is present in the mixture. The term PVDF also covers PVDFs which are modified, for example with elastomers.

Among the polymers which are incompatible with PVDF there may be mentioned, for example, polyamides. Polyamide will be intended to mean homopolyamides, copolyamides or polyamide blends. By way of examples of polyamides (PA) there may be mentioned PA 6-6, PA 6, PA 6-12, PA 11 and PA 12 or blends of these. The polyamide blends may be those consisting of a polyamide matrix in which particles of another polymer are dispersed, such as those described in U.S. Pat. No. 4,174,358. The polyamides may also contain plasticizers. The invention therefore provides a bonding agent which makes it possible to compatibilize, inter alia, polyamides with PVDF.

The bonding agent may contain compounds other than polymer A, for example conventional additives or fillers, in conventional proportions, these being known to a person skilled in the art. However, polymer A may also represent all or virtually all of the bonding agent.

The bonding agent may thus additionally contain plasticizers, elastomers and various additives which are compatible with the polymer A. By way of example, the bonding agent may consist of at least 10% by weight of polymer A, the remainder being PVDF and an impact modifier. An example of such a composition is given below, containing (in % by weight):

12 to 20% of polymer A, 30 to 60% of PVDF, 20 to 40% of MBS elastomer the total being 100%.

MBS denotes impact modifiers which are in the form of particles which have a styrene/butadiene rubber core and an acrylic/styrene casing.

The invention also relates to mixtures of polymer A with an additive or polymer for lowering its elasticity modulus for which plasticizers. In fact, the bonding agent consisting of polymer A is too rigid for some applications and it is useful to mix it with an additive or another polymer to make it less rigid. The quantity of this additive or polymer is chosen according to the desired rigidity.

Thus, according to an embodiment, the bonding agent is characterized in that it includes an additive or polymer modifying its rigidity or plasticizing, compatible with the polymer A.

According to an embodiment, the bonding agent includes PVDF, modified or otherwise, representing at least 65%, preferably at least 80%, as % by weight of the bonding agent. The PVDF present thus represents from 30 to 99.9995% by weight, preferably from 65 to 99.98%. The percentages are calculated in relation to the bonding agent containing substantially totally the polymer A. According to this embodiment, the PVDF acts as a plasticizer for the bonding agent.

Besides being a plasticizer, the PVDF added to the bonding agent may also act as an agent imparting a barrier property.

Thus, according to an embodiment, the bonding agent forms a barrier to hydrocarbons.

According to another embodiment, the bonding agent includes PVDF, modified or otherwise, representing at least 65%, preferably at least 80%, as % by weight of the bonding agent. The PVDF present thus represents from 65 to 99.9995% by weight, preferably from 80 to 99.98%. The percentages are calculated in the same way as above.

Hydrocarbons, as this term is employed in the present invention, covers all hydrocarbons including or not including various additives such as alcohols.

POSSIBLE EXPLOITATION IN INDUSTRY

Another subject of the invention is the materials obtained from a bonding agent according to the invention. In these materials the bonding agent may be employed as a coextrusion bonding agent. This multilayered material can be prepared by the usual coextrusion or overmoulding techniques.

According to an embodiment, the material includes, in this order, a layer of PVDF, a layer of the bonding agent according to the invention, and a layer of a polymer incompatible with PVDF. These layers may be sheets or films; they may be planar or cylindrical. They are, for example, tubes.

According to another embodiment, the material is characterized in that the polymer incompatible with PVDF is polyamide. Polyamide is intended to mean homo- and copolyamides and their blends and mixtures.

If the material comprised other layers this would not constitute a departure from the scope of the invention. It is clear that it would be possible to have the bonding agent of the invention a number of times, that is to say that there would be, in this order, PA/bonding agent according to the invention/PVDF/bonding agent according to the invention/PA. Also, for example, on the PVDF layer there could be a layer of polyurethane, that is to say that there would be, in this order, PA/bonding agent according to the invention/PVDF/PU. Further, for example, it would be possible to have on the PVDF layer another bonding agent, for example that described in EP-450,994, then a layer of ABS, that is to say that there would be, in this order, PA/bonding agent according to the invention/PVDF/bonding agent/ABS.

Thus, according to an embodiment, the material additionally includes, on the PVDF side:

(i) either another layer of bonding agent according to the invention and another polymer incompatible with PVDF, (ii) or another layer of polymer compatible with PVDF, (iii) or another layer of another bonding agent and another polymer incompatible with PVDF.

According to an embodiment, the material is characterized in that it includes, in this order, a layer of polyamide, a layer of a bonding agent according to the invention, a layer of PVDF and optionally a layer of a bonding agent according to the invention as well as a layer of polyamide.

According to an embodiment, the material includes a layer of polymer incompatible with PVDF, a layer of a bonding agent according to the invention forming a barrier to hydrocarbons, and a layer of polymer incompatible with PVDF.

According to another embodiment, the material includes, in this order, a layer of polyamide, a layer of a bonding agent according to the invention and a layer of polyamide.

According to yet another embodiment, the material is characterized in that materials based on incompatible polymer which are ground and recycled are added to the layers of incompatible polymer and/or in that a layer made of ground and recycled materials based on incompatible polymer is inserted between the bonding agent and the incompatible polymer.

A particularly advantageous application of the materials consists in the manufacture of pipes and tubes, especially for feeding petrol, which constitute another subject of the invention. A preferred pipe includes the PVDF arranged inside.

Thus, according to an embodiment, in the pipe made of a material according to the invention the layer of PVDF is situated towards the inside.

In fact, for reasons of safety and of environmental protection, motor vehicle manufacturers impose on petrol pipes mechanical characteristics such as mechanical strength, flexibility and characteristics of increased resistance to permeability. The pipes must be as impervious as possible to petroleum products and to their additives, in particular alcohols such as methanol.

Polyamide pipes are at the present time commonly employed in the motor vehicle industry. The polyamides represent an ideal material for this pipe application, their mechanical strength being excellent and their flexibility being sufficient for a pipe to withstand, without breaking, the accumulation of flexural movements practically throughout the life of a vehicle. However, these polyamide pipes no longer meet the new requirements of the motor vehicle manufacturers where permeability is concerned. With the increasingly developed presence of methanol in petrol, the sensitivity of polyamide pipes is reflected in a swelling of the pipe resulting in a decrease in the mechanical properties and dimensional changes.

To overcome this disadvantage, while maintaining the mechanical effects of the polyamides, objectives of the invention consist in sheathing the inner wall of the polyamide pipe with a layer of polyvinylidene fluoride. The polyvinylidene fluoride layer is preferably as thin as possible in order to preserve the flexibility of the polyamide as much as possible, it being known that polyvinylidene fluoride is not known particularly for its flexibility properties.

Thus, according to an embodiment, the invention relates to a pipe, especially for petrol, including an inner layer of PVDF, a lawyer of a bonding agent according to the invention and an outer layer of polyamide.

According to another embodiment, the invention relates to a pipe, especially for petrol, including an inner layer of polyamide, a layer of bonding agent according to the invention to which PVDF has been added and an outer layer of polyamide.

In a recommended manner, since the engine petrol feed pipes generally have an outer diameter of 6 to 12 mm, the thickness of the inner layer of polyvinylidene fluoride is between 10 µm and 1 mm and that of the polyamide between 0.8 and 1.8 mm, an intermediate layer of adhesive bonding; agent between the polyamide and the polyvinylidene fluoride of 10 µm to 1 mm completing the pipe. In the case where the bonding agent forms a barrier, that is to say contains PVDF, the thicknesses are substantially identical with those indicated above.

It is indispensable, in fact, that the polyvinylidene fluoride should be bonded efficiently to the polyamide. A pipe which does not exhibit bonding between the polyvinylidene fluoride and the polyamide cannot have a good flexibility and, consequently, cannot be folded or bent easily by heat-forming; in this case the thinnest material forms creases during the operation.

Furthermore, if the two layers do not adhere to one another, possible condensation of gases between the two layers may in time result in the deformation of the thinnest part of the pipe. In addition, since the pipes are connected together, as well as to the petrol tank and to the carburettor by means of couplings, the latter cannot ensure leaktightness if they bear on two dissociated layers. Finally, in the case where the thickness of the polyvinylidene fluoride layer inside the pipe is very small, for example from 10 to a few tens of µm, and without adhesion, a partial vacuum in the pipe deforms the polyvinylidene fluoride film irreversibly, making the pipe unusable.

It is found that such a pipe, consisting of an inner layer of polyvinylidene fluoride bonded to an outer layer of polyamide using the adhesive bonding agent according to the invention, or alternatively a layer of bonding agent containing PVDF between two layers of polyamide, allows the permeability to be decreased by at least a factor of 10 when compared with that of an equivalent polyamide pipe, while preserving the other properties, such as the cold impact strength, within the limit of the manufacturers' specification.

According to another form of the invention, the petrol pipe may be made up of a middle layer of PVDF with, on each side, a layer of the-bonding agent of the invention and a layer of polyamide, that is to say that the pipe has 5 layers: PA/bonding agent according to the invention/PVDF/bonding agent according to the invention/PA.

It would not constitute a departure from the scope of the invention if, as above, the layer(s) of polyamide included regrinds, that is to say batches of polyamide-based pipes which are ground and mixed with the polyamide. It is also possible to place these regrinds as a layer between the bonding agent and the PA. In the case of the petrol pipes, the bonding agent according to the invention is preferably mixed with PVDF and optionally with PVDF modified with an elastomer or plasticized, and optionally an elastomer compatible with A, as mentioned above, to make it less rigid.

The petrol pipes thus manufactured have an exceptional resistance to alcohols, to alcohol-containing petrols and to heat.

The present invention is therefore also particularly aimed at the pipes including a material according to the invention for feeding petrol. However, other applications are also envisaged by the present invention, such as the manufacture of plastic tanks for storing hydrocarbons, in particular petrol. The term "petrol" employed in the present invention applies to all types of petrols, for feeding engines of all types, turbines and the like.

The present invention is naturally not limited to the embodiments described and shown, but is capable of numerous alternative forms accessible to a person skilled in the art without departing from the spirit of the invention.

We claim:

1. Material having a plurality of layers comprising a first layer of polyvinylidene fluoride (PVDF), a second layer of a bonding agent comprising a polymer A and PVDF, and a third layer of a polymer incompatible with PVDF, said bonding agent imparting a barrier property to hydrocarbons, and the polymer A of the bonding agent comprising units I and II, unit I being defined by a formula

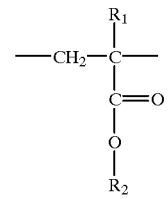

wherein $R_1$ denotes H or a linear or branched alkyl containing from 1 to 20 carbon atoms, and $R_2$ denotes a linear or branched alkyl containing from 1 to 20 carbon atoms, and $R_2$ may be identical or different from $R_1$, provided that $R_2$ may not be H, and unit II being defined by a formula

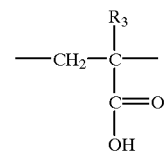

wherein $R_3$ denotes H or a linear or branched alkyl containing from 1 to 20 carbon atoms, wherein $R_3$ is in a form selected from the group acidic, anhydride derivatives, and mixtures thereof, provided that $R_3$ does not comprise imide units; and said material is formed by coextrusion or overmoulding of the plurality of the layers.

2. Material according to claim 1, characterized in that the polymer incompatible with PVDF is polyamide.

3. Material according to claim 1, further comprising on the first layer of PVDF side a structure of layers selected from the group consisting of:

(i) a fourth layer of the bonding agent and a fifth layer of a polymer incompatible with PVDF, (ii) a layer of polymer compatible with PVDF, (iii) and a fourth layer of a bonding agent and a fifth layer of polymer incompatible with PVDF.

4. Material according to claim 1, wherein the second layer of the bonding agent does not comprise polyvalent metal.

5. Material according to claim 1, wherein the bonding agent comprises PVDF in an amount at least 65% by weight of the bonding agent.

6. Material comprising a first layer comprising a polyamide, a second layer adjacent to the first layer comprising the bonding agent as defined in claim 1, and a third layer adjacent to the second layer comprising a polyamide, and wherein the bonding agent forms a barrier to hydrocarbons.

7. Material according to claim 1, wherein a material based on the incompatible polymer with PVDF is ground, recycled and added to the third layer of the incompatible polymer.

8. The material according to claim 1, wherein the bonding agent further comprises an elastomer compatible with polymer A.

* * * * *